United States Patent [19]

Margolin

[11] Patent Number: 5,250,227

[45] Date of Patent: Oct. 5, 1993

[54] ELECTRICALLY CONDUCTIVE COATING COMPOSITION FOR PROVIDING A BEND SENSOR

[75] Inventor: Keith J. Margolin, Gilbertsville, Pa.

[73] Assignee: National Starch and Chemical Investment Holding Corporation, Wilmington, Del.

[21] Appl. No.: 518,343

[22] Filed: May 3, 1990

[51] Int. Cl.$^5$ .............................................. H01B 1/24
[52] U.S. Cl. .................................. 252/511; 252/503; 252/510
[58] Field of Search ........................ 252/511, 510, 503

[56] References Cited

U.S. PATENT DOCUMENTS

| | | | |
|---|---|---|---|
| 4,237,886 | 12/1980 | Sakurada et al. | 252/511 |
| 4,273,682 | 6/1981 | Kanamori | 252/511 |
| 4,600,602 | 7/1986 | Martin et al. | 427/96 |
| 4,695,508 | 9/1987 | Kageyama et al. | 252/511 |
| 4,696,764 | 9/1987 | Yamazaki | 252/503 |
| 4,818,438 | 4/1989 | Wiley | 252/511 |
| 4,874,549 | 10/1989 | Michalchik | 252/511 |
| 4,966,729 | 10/1990 | Carmona et al. | 252/511 |

FOREIGN PATENT DOCUMENTS 0143660  6/1985  European Pat. Off. .

*Primary Examiner*—Paul Lieberman
*Assistant Examiner*—Bradley A. Swope
*Attorney, Agent, or Firm*—Edwin M. Szala

[57] ABSTRACT

A composition is disclosed which forms a bend sensor when coated on a flexible substrate. A bend sensor prepared from the composition is also disclosed. The composition contains a brittle binder which cracks under a stress, electrically conductive elements and a graphite additive which stabilizes the degree of cracking. The composition forms a bend sensor which upon a change in degree of flexing produces an electrical signal in the form of a change in resistance in circuits which include the sensor.

2 Claims, No Drawings

ELECTRICALLY CONDUCTIVE COATING COMPOSITION FOR PROVIDING A BEND SENSOR

FIELD OF THE INVENTION

This invention relates to a composition intended for use in a bend sensor in electronic circuits, and to a bend sensor made with said composition. The sensor detects bending by changing the electronic signal in a circuit that includes the sensor by modifying the resistance in the circuit in response to bending of the sensor. These sensors can be used in controls of various types including data input, game control, and machine operation.

BACKGROUND OF THE INVENTION

U.S. Pat. No. 4,542,291 entitled "Optical flex sensor" discloses a sensor which consists of a flexible tube that has open ends and a reflective interior wall within the flexible tube, a light source placed within one end of the flexible tube and a photosensitive detector, or light transmitting device such as an optical fiber is placed within the other end of the flexible tube so that the intensity of a combination of direct light rays and reflected rays may be detected when the flexible tube is bent. The nature of the photosensitive detector is to change its resistance with light intensity. The combined effect of the bent tube on the light path and the photo-sensitivity of the detector produces a device that changes its electrical resistance when flexed.

U.S. Pat. No. 4,414,537, entitled "Digital data entry glove interface device", discloses a man-machine interface and in particular an interface that permits a user to input data, including alphanumeric and control information, with increased ease and efficiency to electric typewriters, computers, terminals and other types of data utilization devices. The disclosure describes a man-machine interface for translating discrete hand positions representing data characters into corresponding electrical signals. A knuckle-bend sensor is described as a part of the device which reacts to the stress produced on the data entry glove by flexing the corresponding joint. The disclosure states that such a device might use optical, Hall effect, conductive elastomeric, or strain gage sensors.

OBJECTS OF THE INVENTION

An object of the invention is an electronically conductive coating which can be applied to a low cost flexible plastic substrate to produce a bend sensor. A further object of the invention is a bend sensor which produces a consistent numerical value for the ratio of the measured resistance in a flexed or bent position over the resistance in a straight or unflexed condition. An additional object of the invention is such a bend sensor which produces a consistent ratio of resistance over numerous flexes. Another object of the invention is a sensor which displays the change in resistance quickly after a change in flexion of the sensor, without an extended induction or recovery period.

SUMMARY OF THE INVENTION

The present invention provides a coating composition and a flexible bend sensor which comprises the coating on a flexible plastic substrate such as polyester. The coating contains a binder which can be cast on the substrate and then dried and/or cured to a brittle condition at a temperature below the deformation temperature of the substrate. The coating contains conductive elements within the binder, for example a matrix of carbon particles.

The coating also contains graphite particles to stabilize the degree of cracking in the coating and thus stabilize the electrical resistance profile of the sensor. As used herein, the term "resistance profile" refers to the combined characteristics of the sensor with respect to measured resistance in the "flat" position and "bent" position, as well as the ratio between these two measured values. Further, the terms "flat" and "bent" are used herein as indicators of relative position. "Flat" indicates the position of the substrate at the time the coating was cured; in the simplest illustration this position would be flat on a planar surface. The substrate could of course assume a range of non-planar configurations at the time the coating is cured, such as the wall of a cylinder or a portion thereof. "Bent" indicates a flexed position (non-flat) after the coating has been stressed.

Once the coating has been applied to the substrate and dried or cured to a brittle condition, the coated substrate is stressed, for example, by flexing and drawing it over a mandrel. The degree of stress is sufficient to produce cracking within the coating.

DETAILED DESCRIPTION OF THE INVENTION

The flexible bend sensor is produced by applying the coating composition to a substrate. The substrate can be any flexible substrate. Generally, the substrate is a plastic film material such as polyester film. Mylar ® plastic film available from DuPont is an example of a polyester film useful as the substrate. The binder of the coating forms an adherent film on the substrate. The binder must be sufficiently brittle that it will crack upon flexing to produce interruptions in the conductive material as indicated by increased electrical resistance of the sensor when it is in a bent position compared to the resistance of the sensor in the straight position. Examples of useful binders are synthetic resins either in preformed polymer form or in reactive monomers which will form a brittle polymeric coating upon the surface of the substrate. Examples of these resins include phenolic resins.

The coating also contains electrically conductive material in a discontinuous form. An example of this material is carbon particles. The electrically conductive discontinuous material is present in the coating in an amount sufficient to produce interparticle contact or a degree of proximity between the units of conductive material that will conduct electricity through a length of the coating. Generally, the amount of electrically conductive material would be from about 3 weight percent to about 20 weight percent based on the weight of the binder.

The coating also contains a thermoplastic material which contributes to adhesion of the coating to the substrate when it is dried and/or cured at temperatures below the decomposition of the substrate material. Although not intending to be bound by theory, applicant proposes that the thermoplastic resin produces adhesion to the substrate by introducing a flexible adherent polymer in the rigid phenolic composition. Generally, any thermoplastic that is flexible and adherent can be used. A preferred thermoplastic adhesion promoter contains acrylic resin, vinyl resin and polyurethane.

A threshold amount of graphite particles effectively stabilizes the degree of cracking after the initial bending and maintains a consistent ratio of resistance in bent position versus resistance in straight position. Although the coating becomes cracked, the coating still adheres to the substrate. In the absence of the graphite particles, repeated flexing of the substrate produces increased cracking as indicated by a continued upward change in the resistance of the sensor; ultimately producing cracking of the coating to a degree which produces an "open" circuit. In addition to stabilizing the resistance profile of the sensor, the amount of graphite particles present in the coating will adjust the ratio between the resistance in the bent position and the resistance in the straight position. The further addition of graphite particles causes the ratio of resistance in bent position over the resistance in straight position to decrease. For example, a batch of a given formulation can be prepared, and if different samples from the batch are modified using different amounts of graphite particles, those containing above the threshold amount of graphite will produce stable sensors and increasing graphite levels produce lower resistance ratios. When the maximum effective amount of graphite particles is exceeded, the resistance of the sensor does not change between the straight and flexed position. In this case, the ratio of measured resistance in the bent position versus measured resistance in the straight position becomes equal to 1 and the composition will not function as a bend sensor.

Surprisingly, the sensor exhibits rapid changes in resistance without extended delays; the resistance increases in response to flexing and returns to original unflexed resistance without "drifting" gradually toward a new value. The sensor therefore approaches "real time" reaction rates in generating changes in the electric signal.

The following examples are provided to further illustrate the invention. Unless otherwise stated, all quantities are percentages by weight.

EXAMPLES

EXAMPLE 1

A screen printable carbon paste was made by mixing carbon with phenolic resin, inorganic fillers and a mixture of different boiling point solvents as shown in Table 1. Table 1

TABLE 1

Carbon Paste

| Ingredient | Quantity % by Weight |
|---|---|
| Manganese Dioxide | 4.72 |
| TiO$_2$ | 9.44 |
| Phenolic Resin BLS 2700 (Union Carbide) | 25.50 |
| Acetylene Black (Shawinigan) | 7.81 |
| Varcum (5416) Resin 29-112 BTL (Reichhold Chemical Company) | 11.02 |
| Wetting Agent BYK080 (BYK/Chemie Company) | 0.50 |
| Raven Stain 1255 (Colombian Chemicals Company) | 9.44 |
| Barium Sulfate 19028 (Eastman Kodak) | 1.91 |
| Solvent Mixture (Pine Oil Yarmour, Butyl Carbitol, Butyl carbitol acetate, Terpineol) | 27.18 |
| Igepal CO-630 | 0.50 |
| Varcum Resin Methylon 75-108 (Reichhold Chemical Company) | 1.98 |

The mixture was then 3-roll milled to break up any remaining agglomerates and to wet out the carbon.

In this first experiment, the above material was printed onto a polyester substrate to a wet thickness of approximately 38 microns. The wet circuit was placed into an air circulating convection oven at 140° C. for 45 minutes. The dried thickness ranged from 16–18 microns. To easily measure resistance of material, a polymer silver paste (EMCA flexible P2609) was first screen printed and cured as a termination for resistor material. The test coupon was a strip of MYLAR polyester sheet (DuPont) approximately 4¼" long by ⅛" which equals a length of approximately 39 squares of test material (⅛"×⅛"). This composition contained 17.25% carbon which when coated on a test coupon, produced a coating having a resistance of approximately 2,000 ohms/sq. Resistance over the full length of the coupon is 39 times the resistance per square.

The coupon was measured for a starting point resistance which is reported in Table 2 under the heading "$R_{START}$". The coupon was then stressed by rolling over various size mandrels (which are reported under "Mandrel Size" in Table 2 below). The resistance was then measured with the circuit laying flat on the table top and the resulting measurement is reported in the table under the heading "$R_{STRESS}$".

The coupon was then wrapped around a 1" cylinder and the resistance was measured while the coupon was held tightly wrapped; the measurement is reported in the table under the heading "$R_{WRAPPED}$". The ratio $R_{WRAPPED}$: $R_{STRESS}$ was then calculated and is reported in the table below under the heading "Ratio of Resistance".

TABLE 2

| Mandrel Size | $R_{START}$ | $R_{STRESS}$ | $R_{WRAPPED}$ | Ratio of Resistance |
|---|---|---|---|---|
| 1/16" | 66.5 KΩ | Total loss of adhesion | N/A | Total OPEN |
| ⅛" | 65.3 KΩ | 128 KΩ | 8.2 MegΩ | 64:1 |
| ⅜" | 69.8 KΩ | 72.8 KΩ | 6.9 MegΩ | 95.8:1 |
| ½" | 71.2 KΩ | 75.1 KΩ | Off scale | Too unstable off scale |

To test adhesion to the polyester substrate, a cross hatch tape test was performed on each coupon using ASTM D3359 test procedure using #810 Scotch Tape. All four to the cross hatch tape test, having poor to no adhesion to the polyester substrate. This Example 1 exhibited failure of material to adhere properly to polyester film during and after flex. This was proven when stressed circuit was wrapped around 1" cylinder with total loss of adhesion following tape peel cross-hatch test per ASTM D3359.

EXAMPLE 2

Composition with Adhesion Promoter

In this experiment, a mixture of vinyl, acrylic and polyurethane as shown in Table 3 was added directly to a sample of carbon paste material which was prepared as in Example 1. The vinyls, acrylics and polyurethane were dissolved in Carbitol Acetate then hand-mixed into the carbon paste in the proportions of 91.84 grams carbon paste with 6.00 grams adhesion promoter.

TABLE 3

Adhesion Promoter Composition

| Ingredient | Quantity % by Weight | Description |
| --- | --- | --- |
| Acryloid B66 (Rohm and Haas Company) | 11.40 | Acrylic Resin |
| Vinyl VYHH (Union Carbide Corp.) | 6.80 | Vinyl Resin |
| Wetting Agent BYK020 (BYK/Chemie Company) | 1.10 | Surfactant |
| Vehicle (Pine Oil Yarmour 4.3, Butyl carbitol acetate 77.8, 17.9 B. F. Goodrich 5703 Estane, Carbitol) | 4.70 | Polyurethane |
| 2-(2-Ethoxyethoxy) Ethyl Acetate (Eastman Kodak) | 59.00 | Solvent |
| (Geon 137) (B. F. Goodrich Company) | 3.40 | Vinyl Resin |
| Surfactant BYK 321 (BYK/Chemie Company) | 1.10 | Surfactant |
| VROH B-211 (Union Carbide Corporation) | 12.50 | Vinyl Resin |

TABLE 4

Test Results

| Mandrel | Start Resistance | Stressed Resistance Flat | Wrapped | Resistance Ratio | Cross Hatch |
| --- | --- | --- | --- | --- | --- |
| 1/16" | 92.59 KΩ | 1.2 meg* | 12.0 meg | 10:1 | 5B |
| ⅛" | 94.6 KΩ | 99.1 KΩ | 4.1 meg | 41.4:1 | 5B |
| ¼" | 94.08 KΩ | 97.01 KΩ | 2.1 meg | 21.6:1 | 5B |

*During stress sample was creased 180° inadvertently.

The paste described in Table 3 was screen printed and tested according to the procedures described in Example 1, the results are shown in Table 4. The data shows that all samples passed the adhesion test using the same cross-hatch tape test and procedure as in Example 1. Note that the degree of cracking changes when mandrels of different sizes are used.

EXAMPLE 3

Graphite Addition

The purpose of this experiment is to introduce material that will control the ratio of resistance in material made in Example 2. This material is referred to as the graphite dopent.

Table 5 sets forth the ingredients in the graphite dopent and identifies the percentage of graphite in formulation. The ingredients are ground together to produce a paste.

TABLE 5

Graphite Dopent

| Ingredient | Quantity | Description |
| --- | --- | --- |
| Ketjenblack EC | 0.0597 | Carbon |
| Milled Graphite (AR) | 0.1459 | Graphite |
| Phenolic Mixture (28.57, BLS 2700 Union Carbide, 21.43 Varcum (5416), 29-112 BTL, 50.00 solvent mixture) | 0.7944 | Phenolics |

The phenolic mixture described above is a blend of the phenolics from the carbon/phenolic paste to aid in mixing the graphite dopent into the carbon phenolic paste.

The graphite dopent was prepared according to the same procedure as described for the carbon/phenolic paste in Example 1. A sample of 91.84 grams carbon/phenolic paste and 6.00 grams adhesion promoter were mixed and then 1.25 grams graphite dopent was then hand-mixed into this pre-mixture. The graphite dopent mixture itself exhibits poor adhesion to polyester and was found to decrease the adhesion of the formulation in the experiment. The graphite within this formulation is used to lower the resistance ratio (flat vs. bent), moving it closer to a ratio of 1:1.

TABLE 6

| Mandrel | Start Resistance | $R_{STRESS}$ | $R_{WRAPPED}$ | Ratio | Adhesion |
| --- | --- | --- | --- | --- | --- |
| ⅛" | 100.7 KΩ | 140.0 KΩ | 1.78 MΩ | 12.7:1 | Fail |
| ¼" | 94.89 KΩ | 107.99 KΩ | 1.03 MΩ | 10.8:1 | Marginal |
| ½" | 94.03 KΩ | 105.1 KΩ | 699.5 KΩ | 6.6:1 | Fail |

EXAMPLE 3A

A second experiment was run adding an increased amount of graphite dopent to the formula to bring the resistance ratio lower (or closer to 1:1).

A paste was prepared by hand mixing the following ingredients:
91.84 g carbon/phenolic
6.00 g adhesion promoter
2.50 g graphite dopent.

The paste was added into carbon paste made according to Example 3. The resulting composition was applied to test coupons and evaluated as described in Example 1. The results are reported in Table 7.

TABLE 7

| Mandrel | Start Resistance | $R_{STRESS}$ | $R_{WRAPPED}$ | Ratio | Adhesion |
| --- | --- | --- | --- | --- | --- |
| ⅛" | 87.50 KΩ | 112.6 KΩ | 699.0 KΩ | 6.2:1 | Marginal |
| ¼" | 87.31 KΩ | 95.5 KΩ | 415.3 KΩ | 4.3:1 | Marginal |
| ½" | 83.90 KΩ | 88.77 KΩ | 299.6 KΩ | 3.3:1 | Marginal |

The resistance ratio was lowered by the added graphite.

EXAMPLE 4

A new formulation was prepared using an increased amount of graphite dopent to obtain a resistance ratio between 2.0:1 and 3.3:1. The level of adhesion promoter was increased to counteract the negative impact of increased graphite content as observed in the earlier examples.

A mixture of carbon/phenolic paste was prepared according to the formula 91.84 grams carbon/phenolic, 9.00 grams adhesion promoter, and 5.30 grams graphite dopent. The mixture was hand-mixed and then screen printed as described in Example 1. Test results are reported in Table 8.

TABLE 8

| Mandrel | Start Resistance | Stressed Resistance Flat | Resistance Wrapped Around 1" Cylinder | Resistance Ratio | Cross Hatch |
| --- | --- | --- | --- | --- | --- |
| ⅛" | 93.16 KΩ | 114.7 KΩ | 335.2 KΩ | 2.9:1 | 5B |
| ¼" | 96.53 KΩ | 102.5 KΩ | 273.2 KΩ | 2.7:1 | 5B |
| ½" | 97.81 KΩ | 102.1 KΩ | 221.4 KΩ | 2.2:1 | 5B |

The data shows that the composition produced a sensor that meets the goal of good adhesion, unflexed resistance of approximately 100 KΩ and a ratio of between 2:1 and 3:1.

Table 9 is a compilation of the above reported examples, the percent of dopent and graphite present are reported along with test results.

TABLE 9

| | Ratio of Resistance Bent Vs. Flat % Dopent with Adhesive Promoter in Ink | | | | |
|---|---|---|---|---|---|
| | % Dopent/Actual % Graphite Total Formulation | | | | |
| Mandrel | 0%/0% | 1.26%/0.1-8% | 2.49%/0.36% | 4.99%/0.77% | |
| 1" | N/A | 12.7:1 | 6.2:1 | 2.9:1 | Ratio |
| 1" | 41.4:1 | 10.8:1 | 4.3:1 | 2.7:1 | Ratio |
| 1" | 21.6:1 | 6.6:1 | 3.3:1 | 2.2:1 | Ratio |

I claim:

1. An electrically conductive composition for coating on a flexible polyester film substrate and providing a bend sensor in electronic circuits comprising
   a) a polymeric binder system comprising phenolic resin that dries and/or cures to a brittle coating which cracks when bent around a mandrel;
   b) an amount of discontinuous conductive carbon black ranging from about 3 to 20 wt. percent based on the weight of the binder effective to produce a desired electrical resistance in the composition;
   c) graphite particles in an amount effective to stabilize the resistance profile of the composition after cracking on a mandrel and less than the amount that produces a composition having a resistance ratio (bent/straight) equal to 1:1, and
   d) a thermoplastic additive to improve adhesion of the composition to said polyester substrate, said additive comprising thermoplastic resin containing acrylic resin, vinyl resin and polyurethane, surfactant and organic solvent therefor.

2. The composition of claim 1 wherein the resistance ratio is greater than about 2:1 and less than 10:1.

* * * * *